(12) United States Patent
Peterson et al.

(10) Patent No.: US 11,258,720 B2
(45) Date of Patent: Feb. 22, 2022

(54) FLOW-BASED ISOLATION IN A SERVICE NETWORK IMPLEMENTED OVER A SOFTWARE-DEFINED NETWORK

(71) Applicant: Entry Point, LLC, Salt Lake City, UT (US)

(72) Inventors: Jeffrey Peterson, Idaho Falls, ID (US); Eric Turner, Idaho Falls, ID (US)

(73) Assignee: Entry Point, LLC, Salt Lake City, UT (US)

( * ) Notice: Subject to any disclaimer, the term of this patent is extended or adjusted under 35 U.S.C. 154(b) by 21 days.

(21) Appl. No.: 16/875,742

(22) Filed: May 15, 2020

(65) Prior Publication Data

US 2021/0359951 A1 Nov. 18, 2021

(51) Int. Cl.
*H04L 12/46* (2006.01)
*H04L 67/51* (2022.01)
*H04L 47/2483* (2022.01)
*H04L 47/2441* (2022.01)

(52) U.S. Cl.
CPC ...... *H04L 47/2483* (2013.01); *H04L 12/4641* (2013.01); *H04L 47/2441* (2013.01); *H04L 67/16* (2013.01)

(58) Field of Classification Search
CPC ............ H04L 47/2483; H04L 12/4641; H04L 47/2441; H04L 67/16
See application file for complete search history.

(56) References Cited

U.S. PATENT DOCUMENTS

| | | | |
|---|---|---|---|
| 9,215,237 B2* | 12/2015 | Sonoda | H04L 63/105 |
| 10,951,586 B2* | 3/2021 | Cohn | H04L 12/4641 |
| 2016/0006696 A1* | 1/2016 | Donley | H04L 63/0236 |
| | | | 709/223 |
| 2018/0309781 A1* | 10/2018 | Tandel | H04L 12/4641 |

\* cited by examiner

*Primary Examiner* — Sm A Rahman
(74) *Attorney, Agent, or Firm* — Kirton McConkie; Brian Tucker

(57) ABSTRACT

Flow-based isolation can be provided in a service network that is implemented over a software-defined network, and particularly in a dynamic open-access network environment. End user premises devices can be configured with one or more service network isolation flows that apply to communications within the service network. Such service network isolation flows can define rules for dropping any outgoing communication that is destined for an IP address within the service network. Such service network isolation flows can also define rules for dropping any incoming communication that originated from an IP address within the service network. By employing service network isolation flows on the end user premises devices to block communications on the service network between end user premises devices, service isolation over the software-defined network and customer isolation within the service network can be provided without the inherent limitations of S-Tag/C-Tag techniques that hinder the scaling of software-defined networks.

18 Claims, 8 Drawing Sheets

FLOW-BASED ISOLATION IN A SERVICE NETWORK IMPLEMENTED OVER A SOFTWARE-DEFINED NETWORK

CROSS-REFERENCE TO RELATED APPLICATIONS

N/A

BACKGROUND

This background provides context for embodiments of the present invention and should not be considered as admitted prior art.

Software-defined networking (SDN) is a general term which includes a number of networking technologies. SDN aims to separate the control plane of the network from the data plane of the network to create an agile and flexible network. In a software-defined network, the switch(es) or other components that form the physical topology of the network can communicate with the controller, which is software that manages the control plane of the network, to determine how frames should be directed within the network. In this way, the controller can create, modify, or remove network services dynamically. These services are connections that are provisioned between two network endpoints.

During this provisioning of services, the physical topology of the network remains unchanged. Instead, to provision a service (e.g., between a user's home and an edge switch of a provider), the controller will typically employ knowledge of the network topology including how the endpoints are physically interconnected, current traffic on the network, and any quality of service requirements (among possible other factors) to select and create a virtual network between the endpoints. This is accomplished by programming the appropriate switches or other components to forward frames pertaining to the service so that they traverse a selected path to reach their endpoint. In some implementations, only components located at the edge of the network topology may implement this software-defined networking technique.

FIG. 1 provides a simplified example of an SDN architecture 100. SDN architecture 100 includes a network 130 that consists of a number of interconnected core switches 130-1 through 130-n (where n can represent any integer) that form a switching fabric. A number of entities can connect to network 130 including service providers and end users. Service providers may typically include a network that connects to network 130 via an edge switch 132. In contrast, an end user may typically employ an end user premises device 110 to connect to network 130.

In the example depicted in FIG. 1, a streaming video provider network 140a (e.g., Netflix, Hulu, Sling, etc.), an internet service provider network 140b, and a security provider network 140c are each connected to a particular port of edge switch 132. Additionally, a user's premises (e.g., a home or business location) is shown as including a smart TV 150a, a PC 150b and a security system 150c, each of which is connected to end user premises device 110.

Various protocols and techniques exist for provisioning services in an SDN architecture. For example, a software-defined network may be configured to employ VLAN tags (or other identifiers) within the frames to define to which service the frames pertain. By accessing the VLAN tag in a frame it receives, a switch can determine, based on its programmed rules (or flows), how to forward the frame so that the frame traverses the path that was defined for that service. In this type of environment, frames pertaining to multiple services, including those from different VLANs, can be transferred over the same physical wire but remain isolated due to the VLAN tags they include.

Current standards enable the use of both a service VLAN tag (or S-Tag) and a customer VLAN tag (or C-Tag) within an ethernet frame. The S-Tag generally functions to logically isolate one service provider's communications from another service provider's communications within a software-defined network. The S-Tag would therefore typically be assigned by the network operator. On the other hand, the C-Tag generally functions as a customer-specific identifier that is managed by the service provider. Accordingly, in the context of FIG. 1, the network operator could assign the streaming video provider a particular S-Tag that will be used for communications it sends over network 130 while the streaming video provider could independently assign C-Tags to the end users that have subscribed to the streaming video service.

SDN architecture 100 can represent a dynamic open-access network. In such networks, the end users can select which services they want, and the services will be dynamically provisioned. End user premises device 110 enables this dynamic provisioning of services. For example, in response to the user selecting the streaming video service, end user premises device 110 can be configured to implement VLAN tagging techniques to ensure that a logically isolated "service network" is implemented over network 130 between end user premises device 110 and streaming video provider network 140a.

FIG. 2 provides more detail regarding how end user premises devices can be configured and managed in SDN architecture 100 to provide a dynamic open-access network. In FIG. 2, many end user premises devices 110-1 through 110-n (collectively, end user premises devices 110) are shown, each of which is connected to network 130 (e.g., via a particular switch). A management solution 200 is also shown as being connected to network 130 via a management switch 220. Management switch 220 can represent an edge switch that is connected to network 130 and that is configured to implement VLAN tagging. Management router 210 can represent any router that is physically connected to management switch 220 for the purpose of routing communications between the various VLANs that management switch 220 provides. For example, management router 220 may divide its physical interface into virtual sub-interfaces for terminating the various VLANs.

Within this topology, a service network (or "management network 250") can be defined for allowing management solution 200 to communicate with the end user premises devices 110. This can be accomplished by employing a particular S-Tag for any communications that are sent between management server 200 and one of end user premises devices 110. This S-Tag will isolate communications sent between management solution 200 and end user premises devices 110 from other communications sent over network 130 (e.g., communications sent by the streaming video provider which would include a different S-Tag). Additionally, to prevent one end user premises device 110 from accessing communications sent over management network 250 that pertain to another end user premises device 110, management server 200 can assign a particular C-Tag to each end user premises device 110. Furthermore, each end user premises device 110 will be assigned an IP address within management network 250. Accordingly, the combination of the S-Tag defined for management network 250, the C-Tag assigned to the end user premise's device and the end user premises device's IP address within management network 250 is used to route communications sent over network 130 between management server 200 and end user premises devices 110.

FIG. 3 provides a simplified example of how the IP address, C-Tag and S-tag combination is used to route communications sent by management solution 200 to end user premises devices 110. In this example, it is assumed that, in step 1, management solution 200 has sent a communication (e.g., in the form of a frame) that includes the IP address assigned to end user premises device 110-1 within management network 250. This communication will be received at a particular port of management switch 220 and, in step 2, management switch 220 will deliver the communication to management router 210 to route the communication to management network 250. In step 3, management router 210 employs routing rules 210a to determine which C-Tag to add to the communication. For example, routing rules 210a can map end user premises device 110-1's IP address to a C-Tag. Management router 210 then delivers the communication with the C-Tag to management switch 220 (e.g., to another particular port of management switch 220). In step 4, management switch 220 employs flows 220a to determine which S-Tag to add to the communication so that the communication will be delivered appropriately over network 130 to end user premises device 110-1. For example, flows 220a may map an IP address/C-Tag combination to an S-Tag. Management switch 220 will then send the communication with the S-Tag, C-Tag and IP address over network 130 which in turn will cause the communication to be delivered to end user premises device 110-1. Due to the inclusion of the C-Tag, the communication will not be accessible to other end user premises devices thus providing isolation within management network 250. Finally, upon receiving the communication, end user premises device 110-1 can remove the S-Tag and C-Tag and process the communication appropriately (e.g., by performing any management functionality defined in the communication).

Similar steps can be performed when communications are sent from end user premises device 110-1 to management solution 200. For example, end user premises device 110-1 can employ flows to add the appropriate S-Tag and C-Tag to cause a communication to be delivered to management switch 220. Management switch 220 can then remove the S-Tag and deliver the communication with the C-Tag to management router 210. Management router 210 can then remove the C-Tag and route the communication to management solution 200.

Although the example in FIG. 3 is given in the context of a management network, which is one type of service network that would typically include all end user premises devices, a similar technique and architecture can be employed to implement any service network, which may typically include only a subset of the end user premises devices. For example, if an end user, who is connected to network 130 via end user premises device 110-1, subscribes to the streaming video service, a streaming solution, which is part of streaming video provider network 140a, edge switch 132 and a router could function in a similar manner as management solution 200, management switch 220 and management router 210 respectively to implement a service network that includes end user premises device 110-1. Therefore, in a typical use case, each end user premises device 110 will be part of a management network (which allows the end user premises device to be managed) and may also be a part of one or more other service networks (which could be provisioned dynamically as the end users subscribe to the various services available in the software-defined network).

This architecture and technique have various limitations which make it difficult to scale a software-defined network and particularly a dynamic open-access network. For example, a VLAN tag is defined using 12 bits thus limiting the number of unique VLAN tags to 4092 (some values of the 4096 possible values are reserved). Accordingly, if there are more than 4092 end user premises devices in a service network such as management network 250, more than one S-Tag will be required. More particularly, with a single S-Tag, there will be 4092 unique S-Tag/C-Tag combinations. Thus, to include a second set of 4092 end user premises devices 110 in management network 250, a second S-Tag will be necessary, and so on. As the number of S-Tags increases (or as the number of VLANs that make up management network 250 increases), additional management switches 220 will need to be added to network 130. It will also be necessary to increase the number of management routers 210 to interconnect each of the VLANs. Furthermore, each management router 210 will need to be physically connected to the management switch(es) 220 that provide the VLANs that the router interconnects. Accordingly, from a practical perspective, the use of an S-Tag, C-Tag and IP address to isolate communications between management solution 200 and end user premises devices 110 allows a relatively small number of end user premises devices 110 to exist in a dynamic open-access network. This same limitation exists for any service network.

BRIEF SUMMARY

The present invention is generally directed to methods, systems and computer program products for providing flow-based isolation in a service network that is implemented over a software-defined network, and particularly in a dynamic open-access network environment. End user premises devices can be configured with one or more service network isolation flows that apply to communications within the service network. Such service network isolation flows can define rules for dropping any outgoing communication that is destined for an IP address within the service network. Such service network isolation flows can also define rules for dropping any incoming communication that originated from an IP address within the service network. By employing service network isolation flows on the end user premises devices to block communications on the service network between end user premises devices, service isolation over the software-defined network and customer isolation within the service network can be provided without the inherent limitations of S-Tag/C-Tag techniques that hinder the scaling of software-defined networks.

In some embodiments, the present invention may be implemented as method for providing flow-based isolation in a service network that is implemented over a software-defined network. One or more service network isolation flows can be configured on each of a plurality of end user premises devices that are connected to the service network. Each service network isolation flow defines a rule that includes a range of IP addresses that are available within the service network. A first end user premises device of the plurality of end user premises devices can receive a first communication and evaluate the first communication against the one or more service network isolation flows. The first end user premises device can determine that a first service network isolation flow of the one or more service network isolation flows applies to the first communication by determining that a source IP address defined in the first communication falls within the range of IP addresses included in the rule of the first service network isolation flow. Upon determining that the first service network isolation flow applies to the first communication, the first end user premises device can drop the first communication.

A second end user premises device of the plurality of end user premises devices may receive a second communication and evaluate the second communication against the one or more service network isolation flows. The second end user premises device can determine that the second service network isolation flow applies to the second communication by determining that a target IP address defined in the second communication falls within the range of IP addresses included in the rule of the second service network isolation flow. Upon determining that the second service network isolation flow applies to the second communication, the second end user premises device can drop the second communication.

In some embodiments, the present invention may be implemented as a method for providing flow-based isolation in a service network that is implemented over a software-defined network. A first end user premises device of a plurality of end user premises devices that are connected to the service network may maintain a first service network isolation flow that defines that any incoming communication having a source IP address within a range of IP addresses available within the service network should be dropped. The first end user premises device can receive a first communication from a service solution and evaluate the first communication against the first service network isolation flow to thereby determine that the first communication does not have a source IP address within the range of IP addresses available within the service network. In response to evaluating the first communication, the first end user premises device can allow the first communication. The first end user premises device may also receive a second communication from a second end user premises device of the plurality of end user premises devices that are connected to the service network. The first end user premises device can evaluate the second communication against the first service network isolation flow to thereby determine that the second communication has a source IP address within the range of IP addresses available within the service network. The first end user premises device can then drop the second communication.

The first end user premises device may also maintain a second service network isolation flow that defines that any outgoing communication having a target IP address within the range of IP addresses available within the service network should be dropped. The first end user premises device may then receive a third communication from a device that is connected to the software-defined network via the first end user premises device. The first end user premises device can evaluate the third communication against the second service network isolation flow to thereby determine that the third communication has a target IP address within the range of IP addresses available within the service network. In response, the first end user premises device may drop the third communication.

In some embodiments, the present invention may be implemented as computer storage media storing computer executable instructions which, when executed in a software-defined networking architecture that includes a plurality of end user premises devices that are connected to a VLAN that forms a management network and a management solution, provide flow-based isolation by performing the following: maintaining, on each of the plurality of end user premises devices, a first service network isolation flow that defines that any incoming communication that originated within the management network should be dropped and a second service network isolation flow that defines that any outgoing communication that targets one of the end user premises devices should be dropped; receiving, at a first end user premises device of the plurality of end user premises devices, an incoming communication; evaluating, by the first end user premises device, the incoming communication against the first service network isolation flow to determine that the incoming communication originated within the management network; in response to evaluating the incoming communication, dropping the incoming communication; receiving, at the first end user premises device, an outgoing communication; evaluating, by the first end user premises device, the outgoing communication against the second service network isolation flow to determine that the outgoing communication targets one of the end user premises devices; and in response to evaluating the outgoing communication, dropping the outgoing communication.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
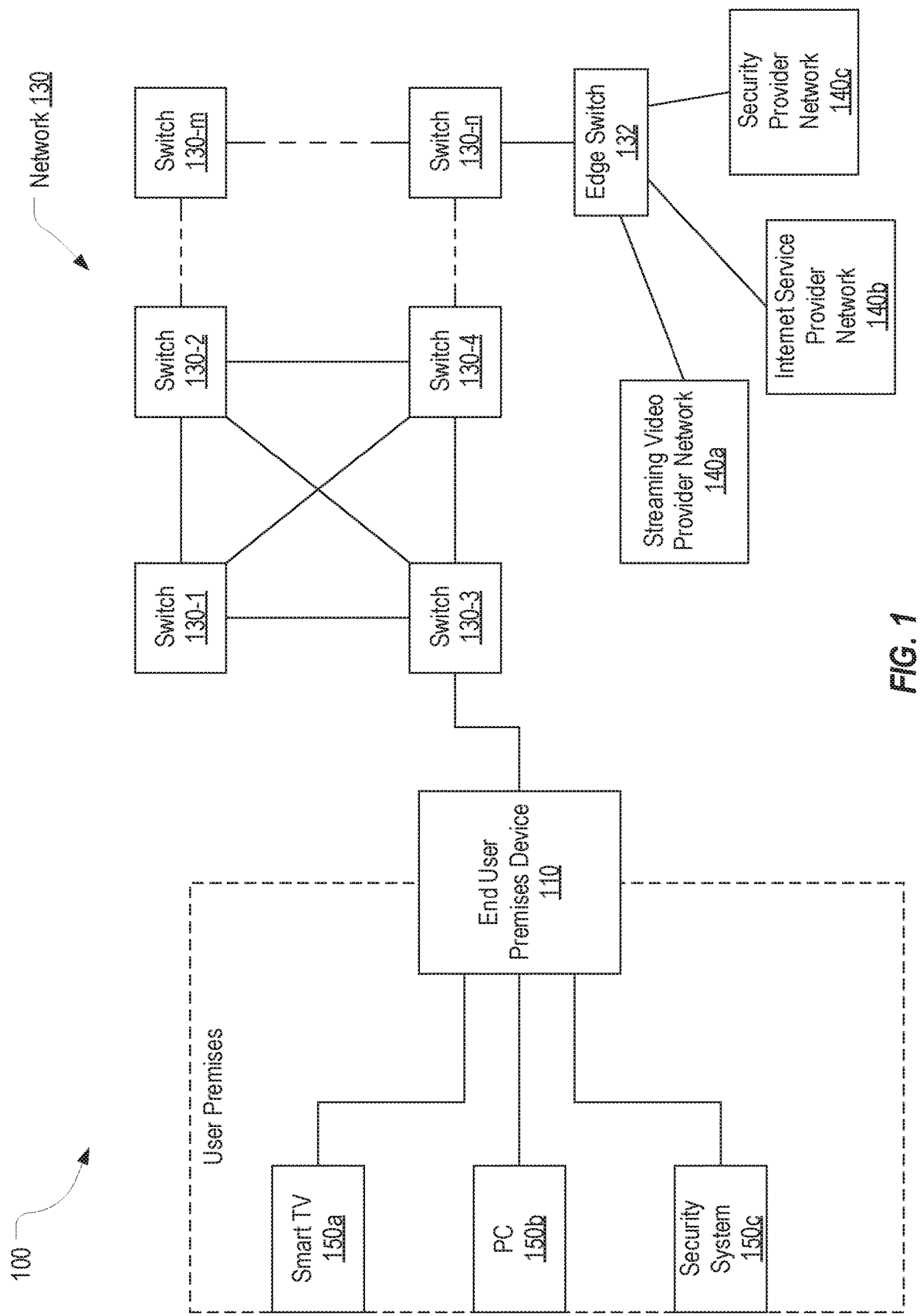
FIG. 1 illustrates an example of a software-defined networking architecture that may exist when embodiments of the present invention are implemented.
Figure 2:
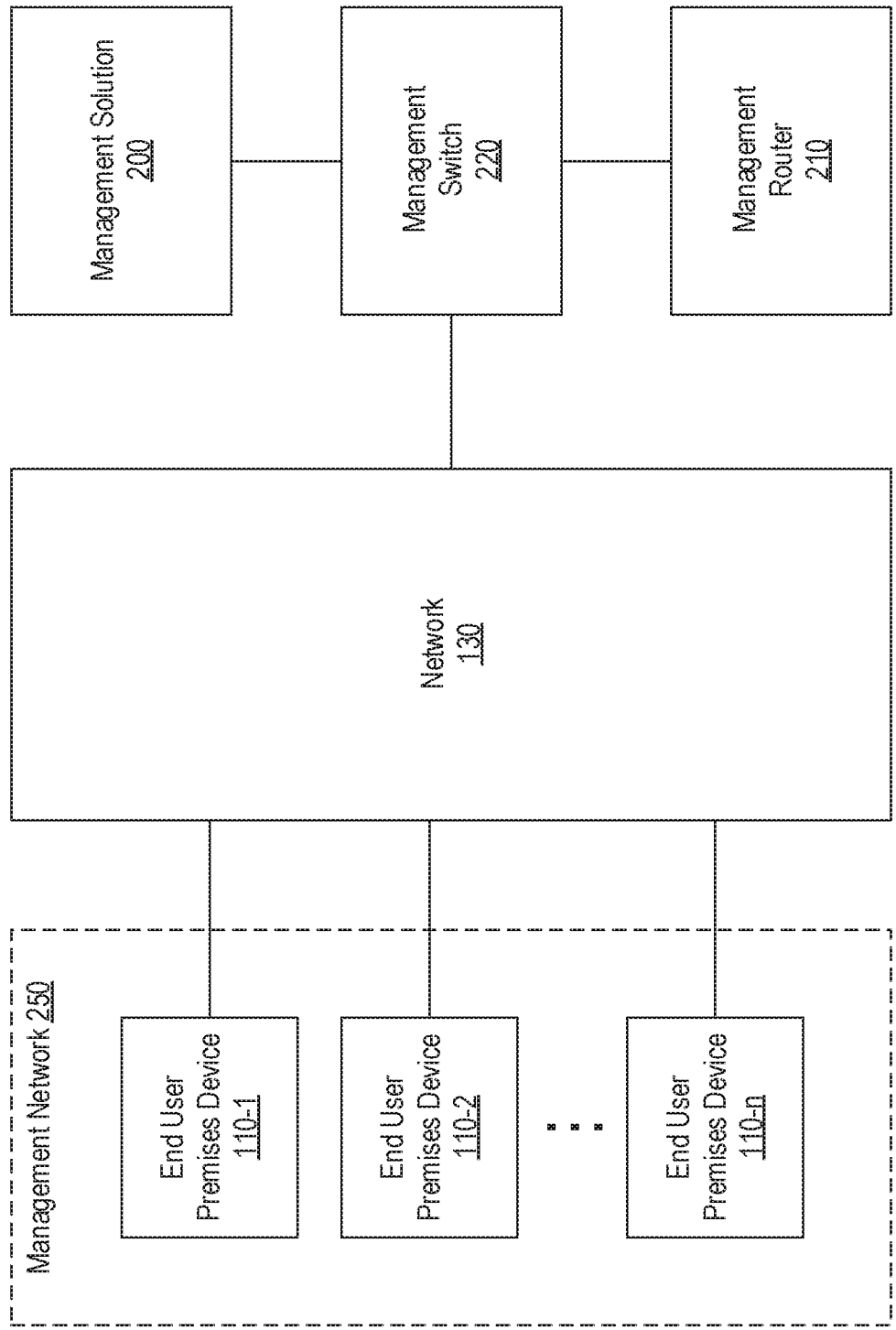
FIG. 2 illustrates that end user premises devices may be arranged into a service network within a software-defined networking architecture.

In this specification and the claims, an "end user premises device" should be construed as an electronic device that is employed as an edge device or edge switch at an end user's premises in a software-defined network (SDN) architecture. The term "flow" should be construed in accordance with its SDN meaning. For example, a flow can be defined as an entry in a flow table where the entry includes a rule and instructions for handling a communication that matches the rule among other information. Accordingly, in the context of an end user premises device, flows applied on the end user premises device can define how the end user premises device should handle communications it receives whether incoming or outgoing. A rule of a flow can define a variety of matching criteria including, for example, a communication's source or destination MAC or IP addresses, VLAN tag, and the port at which the communication is received, among various other criteria. The term "service network" should be construed as a VLAN over which a service solution, such as management solution 200, provides a service and to which end user premises devices that subscribe to the service are connected. A management network is a type of service network and may typically include all end user premises devices. Therefore, this specification will describe embodiments of the present invention in the context of a management network. However, it is to be understood that the following examples represent techniques that can be employed in any service network.

In accordance with embodiments of the present invention, end user premises devices 110 can be configured with "service network isolation flows" that implement isolation within a service network, such as management network 250, provided over a software-defined network and particularly in a dynamic open-access network environment. These service network isolation flows can prevent one end user premises device 110 from communicating over the management network with another end user premises device 110 while still being allowed to communicate with management solution 200 over the management network. With these service network isolation flows, management solution 200 can employ a single S-Tag (or other type of identifier) to isolate communications sent over network 130 from communications pertaining to other services but will not need to rely on C-Tags to isolate communications within the management network. Accordingly, when embodiments of the present invention are implemented, management solution 200 will not need to employ an additional S-Tag for each additional set of 4092 end user premises devices connected to the management network. Therefore, a software-defined network can be scaled without the significant hardware and software overhead that would otherwise be required.

Figure 4:
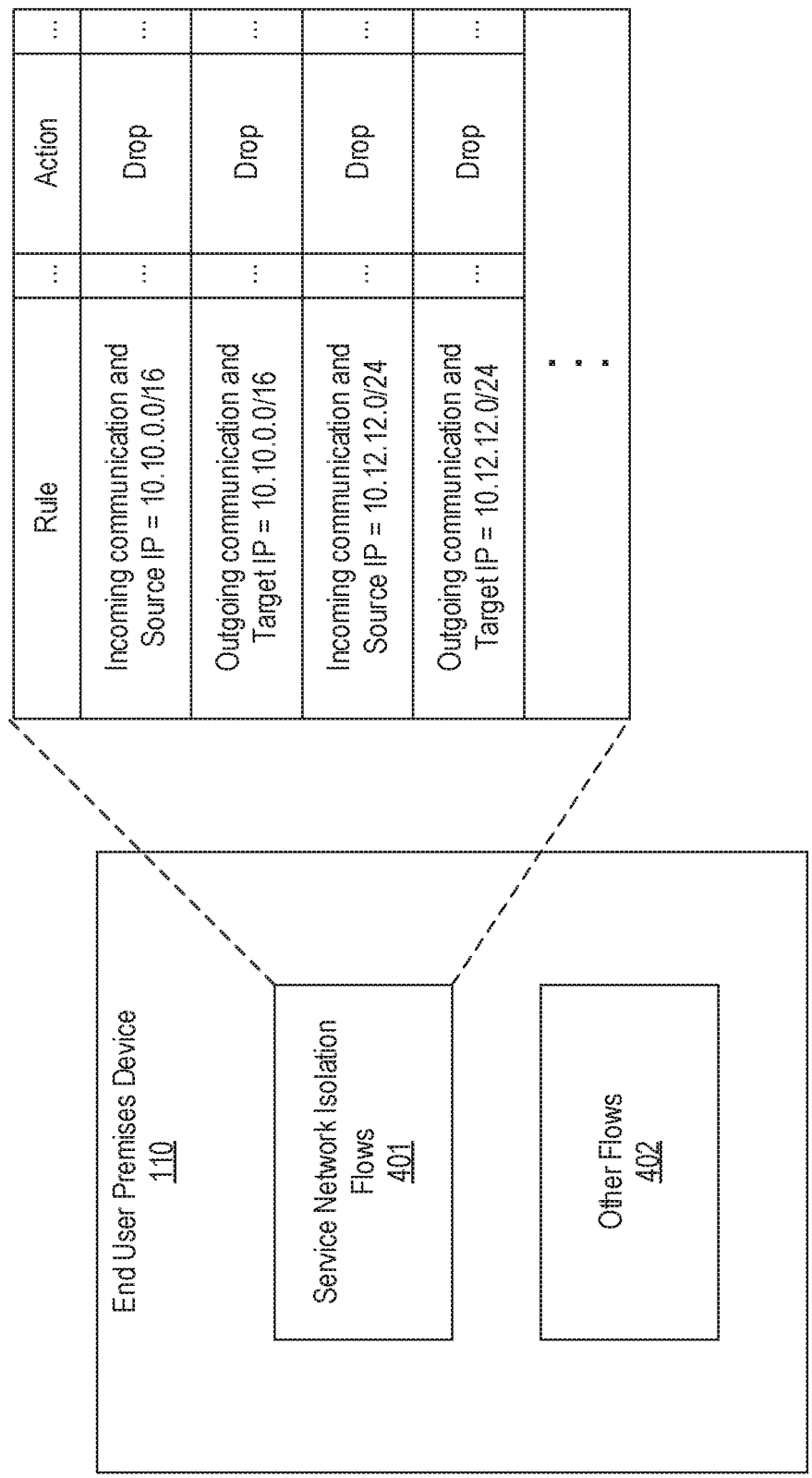
FIG. 4 provides an example of how service network isolation flows can be configured in accordance with embodiments of the present invention to isolate communications within a service network without relying on C-Tags.

FIG. 4 illustrates that an end user premises device 110 can be provisioned with service network isolation flows 401 as well as other flows 402. Service network isolation flows 401 represent one or more flows that are implemented on end user premises device 110 to prevent the end user premises device from communicating with any other end user premises device 110 in management network 250. In contrast, other flows 402 represent one or more flows that are implemented on end user premises device 110 to provision other services at the end user premises. For example, other flows 402 may be employed to provision a streaming video service at the end user premises.

FIG. 4 provides simplified examples of how service network isolation flows 401 may be defined. In these examples, it is assumed that management network 250 is the subnet 10.10.0.0/16. It is noted however that in some implementations, management network 250 may encompass more than one subnet (e.g., 10.10.10.0/8 and 10.10.11.0/8). As shown, service network isolation flows 401 may include a flow having a rule of "incoming communication and source IP=10.10.0.0/16" representing that this flow will apply to any incoming communication received at end user premises device 110 that has a source IP address in the range of 10.10.0.0 to 10.10.255.255. Service network isolation flows 401 may also include a flow having a rule of "outgoing communication and target IP=10.10.0.0/16" representing that this flow will apply to any outgoing communication from end user premises device 110 that has a target IP address in the range of 10.10.0.0 to 10.10.255.255. With both of these flows, the action to be taken when the rule is met is to drop the communication. FIG. 4 further illustrates that service network isolation flows 401 can include flows pertaining to other service networks to which the end user premises device is logically connected. In this case, it is assumed that end user premises device 110 has been configured to receive a service that is provided over a VLAN that encompasses the subnet 10.12.12.0/24 (e.g., a streaming video service, an internet service or a security service) and that the service is configured to implement flow-based isolation in accordance with embodiments of the present invention.

Each end user premises device 110 in management network 250 can be provisioned with service network isolation flows 401. Accordingly, if any end user premises device 110 receives a communication from another end user premises device 110 (i.e., a communication having a source IP address in the subnet 10.10.0.0/16 (or, if there is more than one subnet, in any subnet that management network 250 encompasses)), the end user premises device will drop the communication. Similarly, if any end user premises device 110 receives a communication that targets another end user premises device 110 (e.g., if an end user attempts to access another end user's end user premises device 110), the end user premises device 110 will drop the communication.

Notably, this dropping of communications ensures isolation within management network 250 without relying on C-Tags. Therefore, management solution 200 can employ a single S-Tag to isolate management network communications from communications pertaining to other services sent over network 130 regardless of the number of end user premises devices 110 that may be connected to management network 250.

Figure 5A:
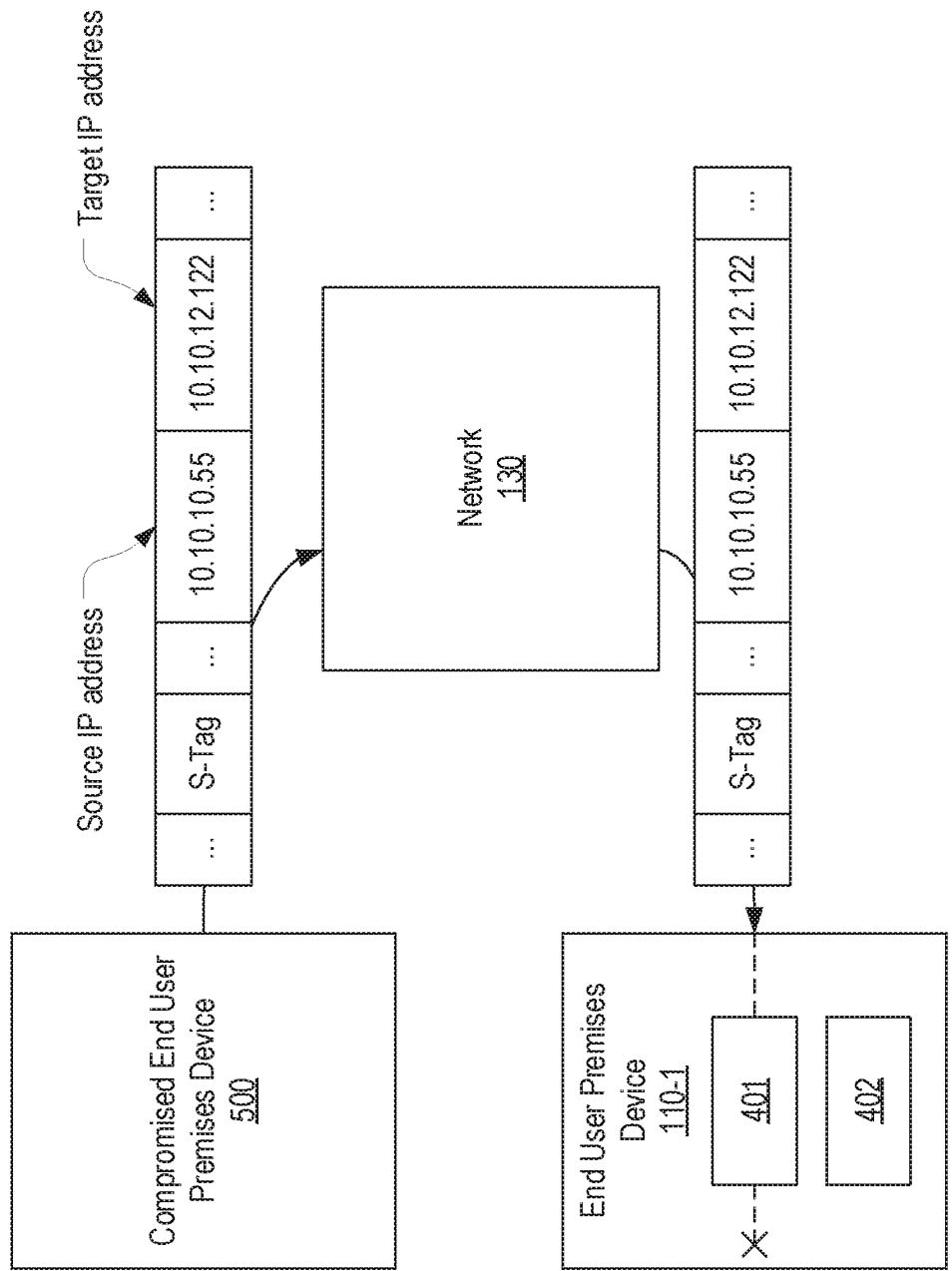
FIG. 5A provides an example of how an end user premises device can employ service network isolation flows to block a communication received over the service network from another end user premises device.

FIG. 5A represents how an end user premises device 110 can employ service network isolation flows 401 to block any communication that originates from another end user premises device 110 (or any other device) within management network 250. In this example, it is assumed that a compromised end user premises device 500 is being employed to attempt to access end user premises device 110-1. There are many ways in which an end user premises device 110 may be compromised, none of which are essential to the present invention. As an example only, a malicious user could gain access to one end user premises device 110 (whether directly or by attaching additional hardware) and then use it to obtain unauthorized access to a service that is provisioned at another end user premises device 110 (e.g., to access another user's Netflix service).

In FIG. 5A, a communication is sent from compromised end user premises device 500 and includes a source IP address of 10.10.10.55, which is assumed to be the IP address assigned to device 500 within management network 250, and a target IP address of 10.10.12.122, which is assumed to be the IP address assigned to end user premises device 110-1 within management network 250. This communication also includes the S-Tag that is employed for routing communications pertaining to management network 250 over network 130. It can be assumed that the malicious user discovered the S-Tag using compromised end user premises device 500. Accordingly, network 130 will route the communication to end user premises device 110-1. Upon receiving the communication, end user premises device 110-1 can evaluate the communication against service network isolation flows 401 (and possibly against other flows 402) to determine which flow(s) are applicable to the communication. Because the communication is incoming and has a source IP address within the 10.10.0.0/16 subnet, end user premises device 110-1 will determine that the communication matches the rule defined in the first flow of service network isolation flows 401 and will therefore apply the corresponding action to drop the communication. Therefore, even though the malicious user has gained access to management network 250 via compromised end user premises device 500, any communication the malicious user may send within management network 250 will be dropped by the receiving end user premises device 110.

Figure 5B:
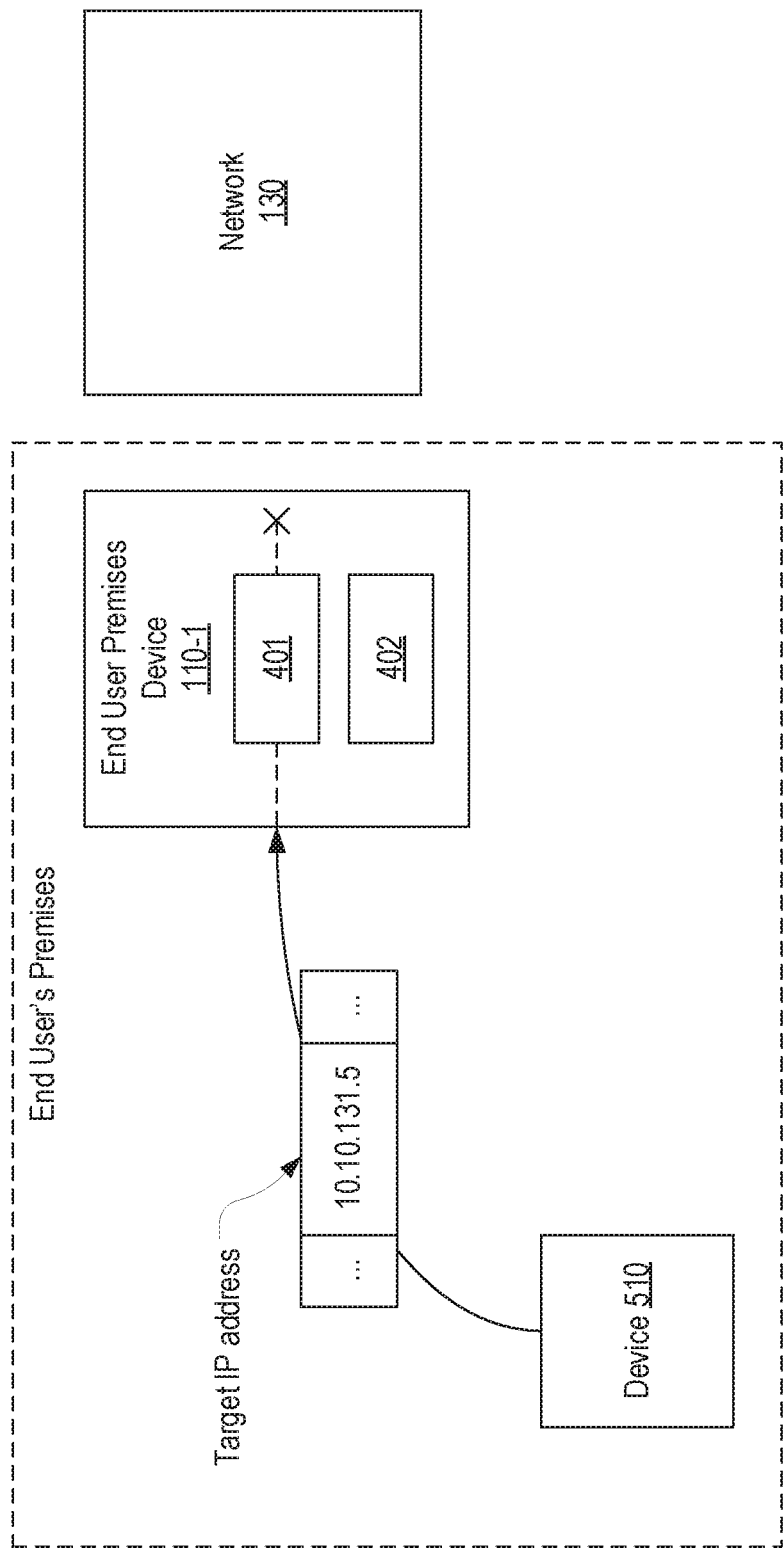
FIG. 5B provides an example of how an end user premises device can employ service network isolation flows to block a communication that targets another end user premises device on the service network.

FIG. 5B represents how an end user premises device 110 can employ service network isolation flows 401 to block any outgoing communication that targets another end user premises device 110 on management network 250. In this example, it is assumed that a device 510 at the end user's premises is connected to end user premises device 110-1. As shown, a malicious user could employ device 510 to attempt to access another end user premises device 110 having an IP address of 10.10.131.5 within management network 250. Upon receiving the communication, end user premises device 110-1 can evaluate the communication against service network isolation flows 401 (and possibly against other flows 402) to determine which flow(s) are applicable to the communication. Because the communication is outgoing and has a target IP address within the 10.10.0.0/16 subnet, end user premises device 110-1 will determine that the communication matches the rule defined in the second flow of service network isolation flows 401 and will therefore apply the corresponding action to drop the communication. Therefore, even if the malicious user creates a setup and discovers the information necessary to send an otherwise validly formatted communication over management network 250, end user premises device 110-1 will block the malicious user's attempts to access any other end user premises device 110.

Figure 5C:
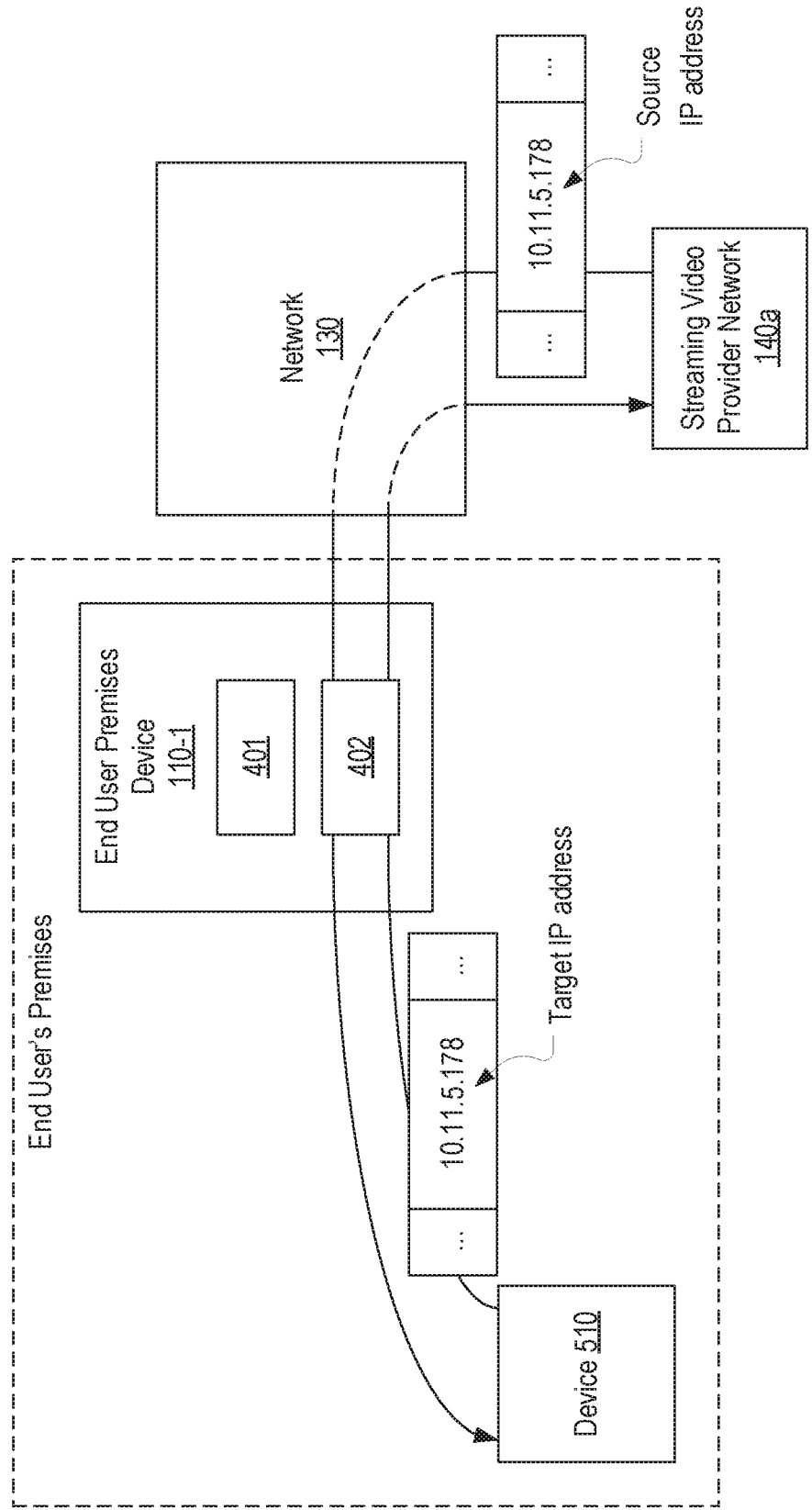
FIG. 5C provides an example of how service network isolation flows allow communications that are not sent within the service network.

In contrast to FIGS. 5A and 5B, FIG. 5C represents how an end user premises device 110 will still be able to communicate with services external to management network 250 even when service network isolation flows 401 are employed. In the depicted example, it is assumed that other flows 402 have been defined on end user premises device 110-1 that provision a streaming video service to the end user's premises. This definition of other flows 402 can be performed by management solution 200 as described generally below. FIG. 5C shows that device 510 sends an outgoing communication with a target IP address of 10.11.5.178, which is assumed to be an IP address employed for the streaming video service within streaming video provider network 140a and receives incoming communications with a source IP address of 10.11.5.178. Because these communications do not match any of service network isolation flows 401, end user premises device 110-1 will not drop them. Although not shown, when sent over network 130 these communications would include an S-Tag that is employed to isolate the streaming video service's traffic within network 130. These communications may also include a C-Tag that the streaming video provider employs (e.g., if the service network for the streaming video service is not configured to implement embodiments of the present invention). Other flows 402 could employ the combination of the S-Tag, C-Tag (if any) and IP address in a similar manner as described in the background.

Figure 3:
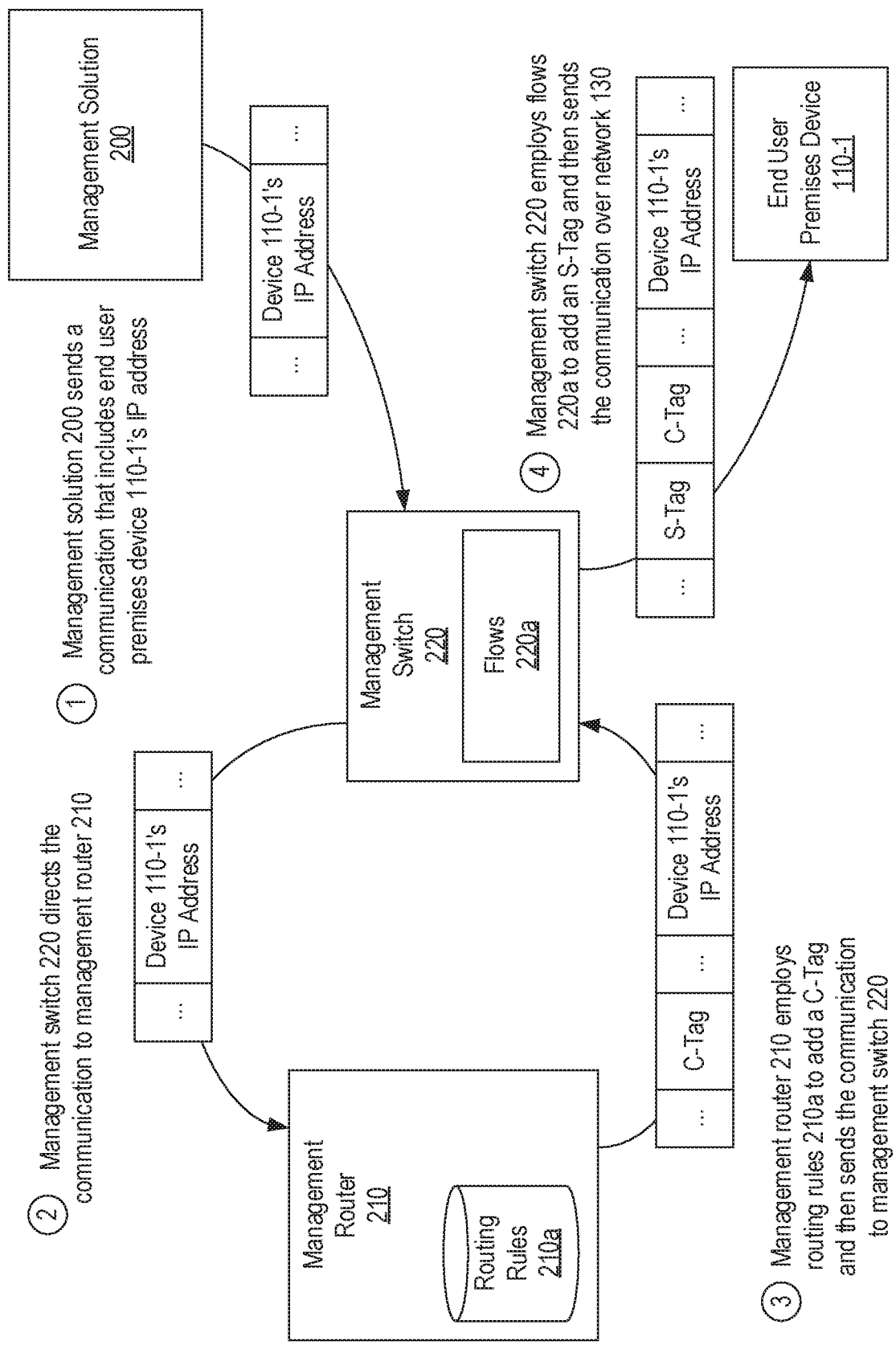
FIG. 3 illustrates how a combination of S-Tags, C-Tags and IP addresses can be employed to isolate communications within a service network.
Figure 6:
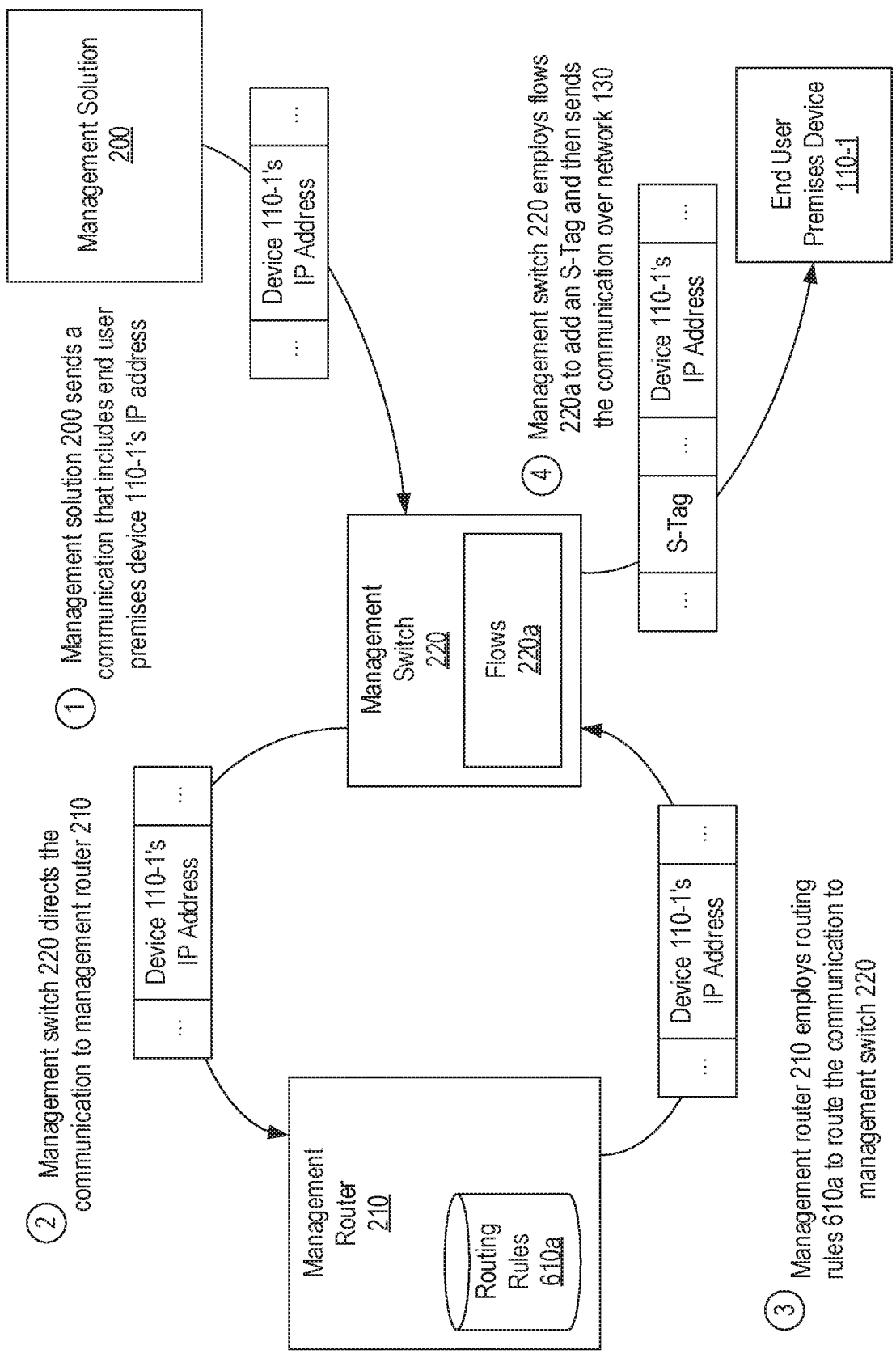
FIG. 6 provides an example of how service network isolation flows enable a service solution to communicate over a service network with each end user premises device while maintaining isolation between the end user premises devices.

FIG. 6 provides an example of how service network isolation flows 401 enable management solution 200 to isolate its communications with end user premises devices 110 without employing C-Tags and by employing a single S-Tag even when management network 250 includes more than 4092 end user premises devices 110. Steps 1 and 2 are the same as those of FIG. 3. However, in step 3, due to the use of service network isolation flows 401, management router 210 can employ routing rules 610a to route the communication. In contrast to routing rules 210a, routing rules 610a do not define C-Tags to be applied to communications sent to end user premises devices 110 over management network 250. Accordingly, routing rules 610a can be simpler than routing rules 210a. The communication without a C-Tag will therefore be delivered to management switch 220a which connects management solution 200 to management network 250. In step 4, management switch 220 can employ flows 220a to add the S-Tag to the communication and then send it over network 130. This S-Tag is the single S-Tag that is employed to isolate all management network traffic within network 130. The communication will travel over network 130 to reach end user premises device 110-1. Although not shown, end user premises device 110-1 will apply service network isolation flows 401 and other flows 402 to determine how to handle the communication. In this case, service network isolation flows 401 will not apply to the communication because its source IP address will not be within the 10.10.0.0/16 subnet. In other words, management solution 200, which may be in a different VLAN, will not have an IP address in the 10.10.0.0/16 subnet. Therefore, end user premises device 110-1 will not drop the communication but will process it appropriately. As an example only, the communication could define one or more flows that end user premises device 110-1 should create or modify to provision a service to the end user's premises. Management solution 200 could communicate with any of the end user premises device 110 in management network 250 in the same manner. In the context of other service networks, an edge switch and router by which the service solution is connected to network 130 could perform similar functionality to isolate traffic sent over the service network to a particular end user premises device without employing C-Tags.

In summary, by implementing service network isolation flows on each end user premises device, a service solution is able to isolate its communications with a particular end user premises device without employing C-Tags. This in turn allows the service network to be scaled without the significant hardware and logistical overhead that would otherwise be required, including far beyond the 4092 device limit that traditional S-Tag/C-Tag techniques face. The service network isolation flows also restrict communication between end user premises devices within the service network.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for providing flow-based isolation in a service network that is implemented over a software-defined network, the method comprising:
   configuring, on each of a plurality of end user premises devices that are connected to the service network, one or more service network isolation flows, each service network isolation flow defining a rule that includes a range of IP addresses that encompasses each subnet in the service network;
   receiving, at a first end user premises device of the plurality of end user premises devices, a first communication;
   evaluating, by the first end user premises device, the first communication against the one or more service network isolation flows;
   determining, by the first end user premises device, that a first service network isolation flow of the one or more service network isolation flows applies to the first communication by determining that a source IP address defined in the first communication falls within the range of IP addresses included in the rule of the first service network isolation flow; and
   upon determining that the first service network isolation flow applies to the first communication, dropping the first communication.

2. The method of claim 1, wherein the first communication includes a service VLAN tag.

3. The method of claim 1, wherein the one or more service network isolation flows includes a second service network isolation flow.

4. The method of claim 3, further comprising:
   receiving, at a second end user premises device of the plurality of end user premises devices, a second communication;
   evaluating, by the second end user premises device, the second communication against the one or more service network isolation flows;
   determining, by the second end user premises device, that the second service network isolation flow applies to the second communication by determining that a target IP address defined in the second communication falls within the range of IP addresses included in the rule of the second service network isolation flow; and
   upon determining that the second service network isolation flow applies to the second communication, dropping the second communication.

5. The method of claim 1, further comprising:
   receiving, at the first end user premises device, a second communication that originated outside the service network;
   evaluating, by the first end user premises device, the second communication against the one or more service network isolation flows;
   determining, by the first end user premises device, that the one or more service network isolation flows do not apply to the second communication; and
   allowing the second communication.

6. The method of claim 5, wherein the service network is a management network and the second communication originated from a management solution.

7. The method of claim 6, wherein the second communication includes a service VLAN tag but does not include a customer VLAN tag.

8. The method of claim 6, wherein allowing the communication comprises adding or modifying a flow on the first end user premises device.

9. The method of claim 8, wherein the flow is one of the one or more service network isolation flows.

10. A method for providing flow-based isolation in a service network that is implemented over a software-defined network, the method comprising:
    maintaining, on a first end user premises device of a plurality of end user premises devices that are connected to the service network, a first service network isolation flow that defines that any incoming communication having a source IP address within one or more subnets in the service network should be dropped;

receiving, at the first end user premises device, a first communication from a service solution;

evaluating, by the first end user premises device, the first communication against the first service network isolation flow to thereby determine that the first communication does not have a source IP address within the one or more subnets in the service network;

in response to evaluating the first communication, allowing the first communication;

receiving, at the first end user premises device, a second communication from a second end user premises device of the plurality of end user premises devices that are connected to the service network;

evaluating, by the first end user premises device, the second communication against the first service network isolation flow to thereby determine that the second communication has a source IP address within the one or more subnets in the service network; and dropping the second communication.

11. The method of claim 10, further comprising:

maintaining, on the first end user premises device, a second service network isolation flow that defines that any outgoing communication having a target IP address within the one or more subnets in the service network should be dropped;

receiving, at the first end user premises device, a third communication from a device that is connected to the software-defined network via the first end user premises device;

evaluating, by the first end user premises device, the third communication against the second service network isolation flow to thereby determine that the third communication has a target IP address within the one or more subnets in the service network; and dropping the third communication.

12. The method of claim 11, further comprising:

receiving, at the first end user premises device, a fourth communication from a device that is connected to the software-defined network via the first end user premises device;

evaluating, by the first end user premises device, the fourth communication against the second service network isolation flow to thereby determine that the fourth communication has a target IP address that is not within the one or more subnets in the service network; and allowing the fourth communication.

13. The method of claim 12, wherein allowing the fourth communication includes:

adding a service VLAN tag to the fourth communication; and forwarding the fourth communication with the service VLAN tag over the software-defined network.

14. One or more computer storage media storing computer executable instructions which, when executed in a software-defined networking architecture that includes a plurality of end user premises devices that are connected to a VLAN that forms a management network and a management solution, provide flow-based isolation by performing the following:

maintaining, on each of the plurality of end user premises devices, a first service network isolation flow that defines that any incoming communication that originated within the management network should be dropped and a second service network isolation flow that defines that any outgoing communication that targets one of the end user premises devices should be dropped;

receiving, at a first end user premises device of the plurality of end user premises devices, an incoming communication;

evaluating, by the first end user premises device, the incoming communication against the first service network isolation flow to determine that the incoming communication originated within the management network;

in response to evaluating the incoming communication, dropping the incoming communication;

receiving, at the first end user premises device, an outgoing communication;

evaluating, by the first end user premises device, the outgoing communication against the second service network isolation flow to determine that the outgoing communication targets one of the end user premises devices; and in response to evaluating the outgoing communication, dropping the outgoing communication.

15. The computer storage media of claim 14, wherein the first service network isolation flow defines a range of IP addresses, and wherein determining that the incoming communication originated within the management network comprises determining that incoming communication has a source IP address within the range of IP addresses.

16. The computer storage media of claim 14, wherein the second service network isolation flow defines a range of IP addresses, and wherein determining that the outgoing communication targets one of the end user premises devices comprises determining that the outgoing communication has a target IP address within the range of IP addresses.

17. The computer storage media of claim 14, wherein the first and second service network isolation flows each define a range of IP addresses that encompasses each IP subnet of the management network.

18. The computer storage media of claim 14, wherein flow-based isolation is provided by further performing the following:

receiving, at the first end user premises device, a second incoming communication;

evaluating, by the first end user premises device, the second incoming communication against the first service network isolation flow to determine that the second incoming communication did not originate within the management network;

in response to evaluating the second incoming communication, allowing the second incoming communication;

receiving, at the first end user premises device, a second outgoing communication;

evaluating, by the first end user premises device, the second outgoing communication against the second service network isolation flow to determine that the second outgoing communication does not target one of the end user premises devices; and in response to evaluating the second outgoing communication, allowing the second outgoing communication.

* * * * *